United States Patent
Lopez et al.

(10) Patent No.: US 7,774,594 B2
(45) Date of Patent: Aug. 10, 2010

(54) METHOD AND SYSTEM FOR PROVIDING STRONG SECURITY IN INSECURE NETWORKS

(75) Inventors: Alejandro P. Lopez, Echirolles (FR); Pedro Vazquez, Revel (FR); Pablo Martikian, Merlan (FR)

(73) Assignee: Oracle America, Inc., Redwood City, CA (US)

( * ) Notice: Subject to any disclaimer, the term of this patent is extended or adjusted under 35 U.S.C. 154(b) by 1240 days.

(21) Appl. No.: 11/335,217

(22) Filed: Jan. 19, 2006

(65) Prior Publication Data

US 2007/0028090 A1    Feb. 1, 2007

(30) Foreign Application Priority Data

Jul. 27, 2005   (EP)   ................... 05300624

(51) Int. Cl.
G06F 21/00   (2006.01)
H04L 9/00    (2006.01)
G06Q 90/00   (2006.01)

(52) U.S. Cl. ...................... 713/153; 713/176
(58) Field of Classification Search .............. 713/153, 713/154, 163, 176; 705/50, 51, 52, 57, 58; 380/203

See application file for complete search history.

(56) References Cited

U.S. PATENT DOCUMENTS

| | | | | | |
|---|---|---|---|---|---|
| 5,142,579 | A | * | 8/1992 | Anderson | 380/30 |
| 5,175,765 | A | * | 12/1992 | Perlman | 380/30 |
| 5,420,927 | A | * | 5/1995 | Micali | 713/157 |
| 5,671,285 | A | * | 9/1997 | Newman | 705/78 |
| 6,125,185 | A | * | 9/2000 | Boesch | 380/285 |
| 6,363,480 | B1 | * | 3/2002 | Perlman | 713/164 |
| 6,460,138 | B1 | * | 10/2002 | Morris | 713/184 |
| 6,754,678 | B2 | * | 6/2004 | Norris et al. | 707/201 |
| 7,016,499 | B2 | * | 3/2006 | Perlman | 380/281 |
| 7,505,476 | B2 | * | 3/2009 | Okagawa et al. | 370/413 |
| 2003/0172278 | A1 | * | 9/2003 | Farnham et al. | 713/176 |
| 2003/0196080 | A1 | * | 10/2003 | Karman | 713/150 |
| 2004/0054905 | A1 | * | 3/2004 | Reader | 713/171 |
| 2006/0053280 | A1 | * | 3/2006 | Kittle et al. | 713/156 |
| 2007/0150720 | A1 | * | 6/2007 | Oh et al. | 713/153 |
| 2007/0283446 | A1 | * | 12/2007 | Yami et al. | 726/27 |
| 2008/0016350 | A1 | * | 1/2008 | Braskich et al. | 713/169 |

OTHER PUBLICATIONS

"Cyptography and Netwrok Security Principles and Practices" William Stalling ISBN 0-13-091429-0.*

European Search Report dated Jan. 2, 2006, Application No. 05300624.3-2413; France (8 pages).

(Continued)

*Primary Examiner*—Kimyen Vu
*Assistant Examiner*—Sayed Beheshti Shirazi
(74) *Attorney, Agent, or Firm*—Osha • Liang LLP

(57) ABSTRACT

A method for providing strong security in an insecure network, involving creating a payload associated with a data packet for transmission by a sending node, determining whether the payload is associated with a unicast data packet, if the payload is associated with the unicast data packet encrypting the payload using a private key associated with the sending node to obtain a unicast encrypted payload, encrypting the unicast encrypted payload using a public key associated with a receiving node to obtain a double-encrypted payload, and transmitting the data packet including the double-encrypted payload to the receiving node over the insecure network.

16 Claims, 4 Drawing Sheets

OTHER PUBLICATIONS

William Stallings, "Chapter 6—Public-Key Cryptography", Cryptography and Network Security: *Principles and Practice* (XP-003470240), Second Edition, Prentice Hall, Upper Saddle River, New Jersey (14 pages).

William Stallings, 18.3—Autentificación De Mensajes Y Funcionies De Mezcla ("Hash"), Comunicaciones Y Redes De Computadores (XP-002360131), Quinta edición, Prentice Hall, Spain (3 pages).

\* cited by examiner

US 7,774,594 B2

METHOD AND SYSTEM FOR PROVIDING STRONG SECURITY IN INSECURE NETWORKS

CROSS-REFERENCE TO RELATED APPLICATIONS

This application claims priority, under 35 U.S.C. §119, to European Patent Application No. 05300624.3 filed Jul. 27, 2005, entitled "METHOD AND SYSTEM FOR PROVIDING STRONG SECURITY IN INSECURE NETWORKS."

BACKGROUND

As reliance on computers and wireless devices has increased, so has the concern for the computer security. The threat of hackers breaking into computer systems or eavesdropping on communications has prompted many corporations and individuals to implement security strategies. Some of these strategies include encrypting data communication using Secure Socket Layer (SSL) protocol and signing digital documents with digital signatures. The aforementioned security mechanisms require encryption keys (i.e., public and private encryption keys) as well as certificates to authenticate the encryption keys.

Conventionally, two forms of encryption exist: symmetric encryption and asymmetric encryption. Symmetric encryption algorithms use only one private key. With this private key, a sender can encrypt a message and a recipient can decrypt the message, but the security of the private key becomes problematic. Asymmetric encryption algorithms include the use of two keys: one public key (known publicly to the world) and one private key (known only to the owner). Asymmetric encryption algorithms are used for both privacy as well as ensuring the sender's authentication (i.e., using a digital signature of the sender). Specifically, data encrypted with a sender's private key can only be decrypted by the sender's public key, guaranteeing that the sender is who the sender claims to be (i.e., authenticating the sender so that another user or machine cannot impersonate the sender) and that the data was not modified while being transmitted over the network. In addition, data encrypted with the receiver's public key can only be decrypted by the receiver's private key, guaranteeing that only the intended recipient will be able to read the data (i.e., ensuring privacy).

Encryption of data exchanged in wireless networks is typically performed using many different types of wireless encryption schemes that employ symmetric encryption or variations of symmetric encryption, such as Wired Equivalent Privacy (WEP), Wi-Fi Protected Access (WPA), and WPA-PSK (i.e., pre-shared key mode). WEP employs the notion of a single shared secret key among nodes of a wireless network. In WEP, a sender uses the shared secret key to encrypt data before transmission, and the receiver decrypts the data using the same shared secret key. Further, in WEP, payload integrity is provided by a cyclic redundancy check (CRC). The CRC is inherently insecure because it is possible to alter the payload and update the message CRC without knowing the shared secret key. WPA greatly improves the insecurity of WEP by increasing the size of the keys, increasing the number of keys in use, and adding a secure message verification system (i.e., message integrity check). WPA is designed for use with an authentication server, which distributes different keys to each node of a wireless network. WPA can also be used in a less secure pre-shared key (PSK) mode, in which the keys are not exchanged through the network, but configured when the network is set up. In this scheme, data is encrypted with a 128-bit key and a 48-bit initialization vector, and payload integrity is provided using a message authentication code that is considered fully secure.

SUMMARY

In general, in one aspect, the invention relates to a method for providing strong security in an insecure network, comprising creating a payload associated with a data packet for transmission by a sending node, determining whether the payload is associated with a unicast data packet, if the payload is associated with the unicast data packet encrypting the payload using a private key associated with the sending node to obtain a unicast encrypted payload, encrypting the unicast encrypted payload using a public key associated with a receiving node to obtain a double-encrypted payload, and transmitting the data packet comprising the double-encrypted payload to the receiving node over the insecure network.

In general, in one aspect, the invention relates to an insecure network system, comprising a sending node configured to double encrypt a payload associated with a data packet using a database of public keys operatively connected to the sending node and a private key of the sending node, if the data packet is a unicast data packet, a receiving node configured to decrypt the double encrypted payload using a database of public keys operatively connected to the receiving node, and the database of public keys operatively connected to the sending node comprising a public key of the receiving node, and the database of public keys operatively connected to the receiving node comprising a public key of the sending node.

In general, in one aspect, the invention relates to a method for providing strong security in an insecure network, comprising creating a payload associated with a data packet for transmission by a sending node, determining whether the payload is associated with a unicast data packet, if the payload is associated with the unicast data packet encrypting the payload using a public key associated with a receiving node to obtain a unicast encrypted payload, encrypting the unicast encrypted payload using a private key associated with the sending node to obtain a double-encrypted payload, and transmitting the data packet comprising the double-encrypted payload to the receiving node over the insecure network.

In general, in one aspect, the invention relates to a computer system for providing strong security in an insecure network, comprising a processor, a memory, a storage device, and software instructions stored in the memory for enabling the computer system under control of the processor, to creating a payload associated with a data packet for transmission by a sending node, determining whether the payload is associated with a unicast data packet, if the payload is associated with the unicast data packet encrypting the payload using a private key associated with the sending node to obtain a unicast encrypted payload, encrypting the unicast encrypted payload using a public key associated with a receiving node to obtain a double-encrypted payload, and transmitting the data packet comprising the double-encrypted payload to the receiving node over the insecure network.

Other aspects of the invention will be apparent from the following description and the appended claims.

DETAILED DESCRIPTION

Figure 1:
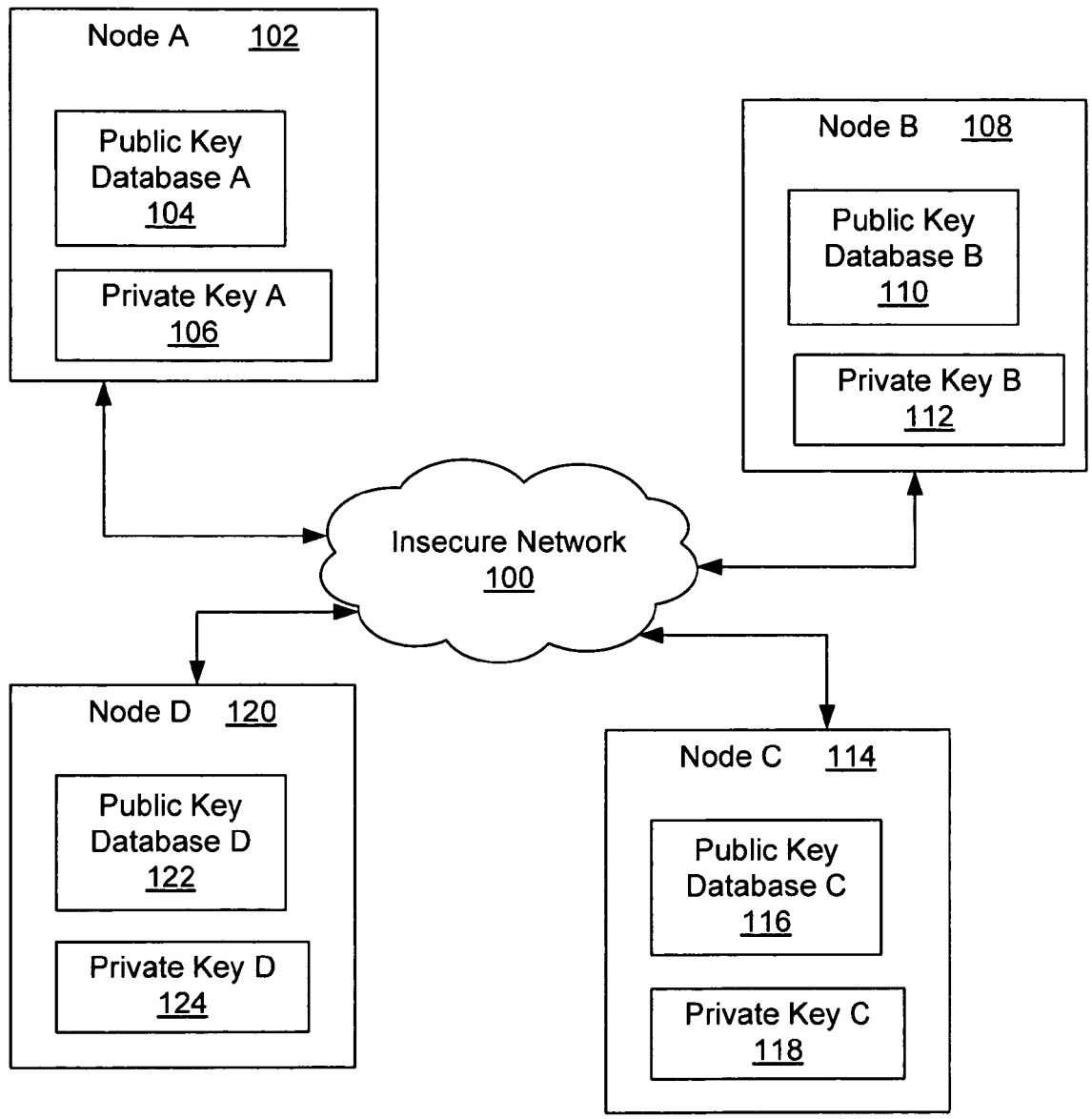
FIG. 1 shows an insecure network system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a method and apparatus for providing strong security (i.e., security that cannot be hacked or tampered with) in an insecure network. Specifically, embodiments of the invention relate to using asymmetric cryptographic algorithms to encrypt data exchanged between nodes in an insecure network. Further, embodiments of the invention relate to encrypting a unicast payload twice, once to ensure privacy and once to ensure authentication of the sender, using asymmetric cryptographic algorithms.

FIG. 1 shows an insecure network (100) system in accordance with one embodiment of the invention. Specifically, the system of FIG. 1 shows several nodes (i.e., Node A (102), Node B (108), Node C (114), Node D (120)) that are part of the insecure network (100). Each node (102, 108, 114, 120) of the insecure network (100) is configured to exchange data using a network protocol stack (not shown). For example, the nodes (102, 108, 114, 120) exchange data in the form of packets using internet protocol (IP). In one embodiment of the invention, the insecure network (100) may be any network that does not have strong security against information attacks, such as a wireless network, the internet, etc. Those skilled in the art will appreciate that the present invention, by providing a method for implementing strong security, allows an insecure network to become secure.

Each node (102, 108, 114, 120) includes a private key (i.e., Private Key A (106), Private Key B (112), Private Key C (118), Private Key D (124), respectively) known only to the node with which the private key is associated. For example, private key A (106) is known only to Node A (102), private key B (112) is known only to Node B (108), etc. Further, in one embodiment of the invention, each node includes a public key database (i.e., Public Key Database A (104), Public Key Database B (110), Public Key Database C (116), Public Key Database D (122), respectively). The public key database (104, 110, 116, 122) stores all the public keys of the nodes that are part of the insecure network (100). For example, Public Key Database A (104) includes public keys for Node B (108), Node C (114), and Node D (120). Those skilled in the art will appreciate that the public keys in the public key database correspond to the private keys stored on each of the corresponding nodes (e.g., Node A's (102) private key A (106) corresponds to Node A's public key). In one embodiment of the invention, the public key database of a given node may also include the public key associated with that node. In one embodiment of the invention, the public key database (104, 110, 116, 122) maps each node's identifying information (e.g., IP address, media access control (MAC) address, alias, etc.) with that node's public key.

Those skilled in the art will appreciate that the public key database (104, 110, 116, 122) may correspond to any look-up data structure (e.g., a table, an array, etc.) that maps a node's identifying information with that node's public key. Further, those skilled in the art will appreciate that the public key database (104, 110, 116, 122) residing on each node of the insecure network (100) may be the same (i.e., an exact copy) or different, depending on whether each node includes its own public key information in the public key database (104, 110, 116, 122).

In one embodiment of the invention, the public key database (104, 110, 116, 122) is populated when the nodes (102, 108, 114, 120) of the insecure network (100) are determined. Thus, in one embodiment of the invention, each node (102, 108, 114, 120) that is determined to be a part of the insecure network (100) submits node identifying information, and its own public key to a network administrator. The network administrator is responsible for installing the keys (both public and private), as necessary, on each node (102, 108, 114, 120) that is determined to be part of the insecure network (100). The public key database (104, 110, 116, 122) on each node is subsequently populated with the mapping of each node's identifying information to the node's public key. In one embodiment of the invention, the identifying information may correspond to network address information. In this scenario, the network address information provided by a node (102, 108, 114, 120) may be the node's IP address or the node's MAC address (i.e., the network address associated with the node's network card). Specifically, if the asymmetric cryptographic algorithms are implemented above the IP layer in the network protocol stack, then each node (102, 108, 114, 120) may provide its IP address for the public key database (104, 110, 116, 122). Alternatively, if the asymmetric cryptographic algorithms are implemented below the IP layer in the network protocol stack, then each node (102, 108, 114, 120) may provide its MAC address for the public key database (104, 110, 116, 122).

Further, in one embodiment of the invention, if a node is dynamically added to the insecure network (100) (i.e., by an administrator), then the administrator may facilitate providing the identifying information of the new node and the new node's public key to all the nodes in the insecure network (100). Specifically, before a node can be dynamically added to the insecure network (100), the node is "introduced" by another member of the insecure network (i.e., an administrator may use one of the member nodes to tell the other nodes that the new node is part of the network and to provide the information to identify the new node). In this manner, the public key database (104, 110, 116, 122) on each node (102, 108, 114, 120) is updated with the dynamically added node's public key. Using this method, the other nodes of the insecure network receive the information associated with the new node via a secure medium. In addition, the new node populates its own public key database with the public keys of the other nodes. This can also be performed by an administrator or automated such that each node sends its public key to the new node.

Figure 2:
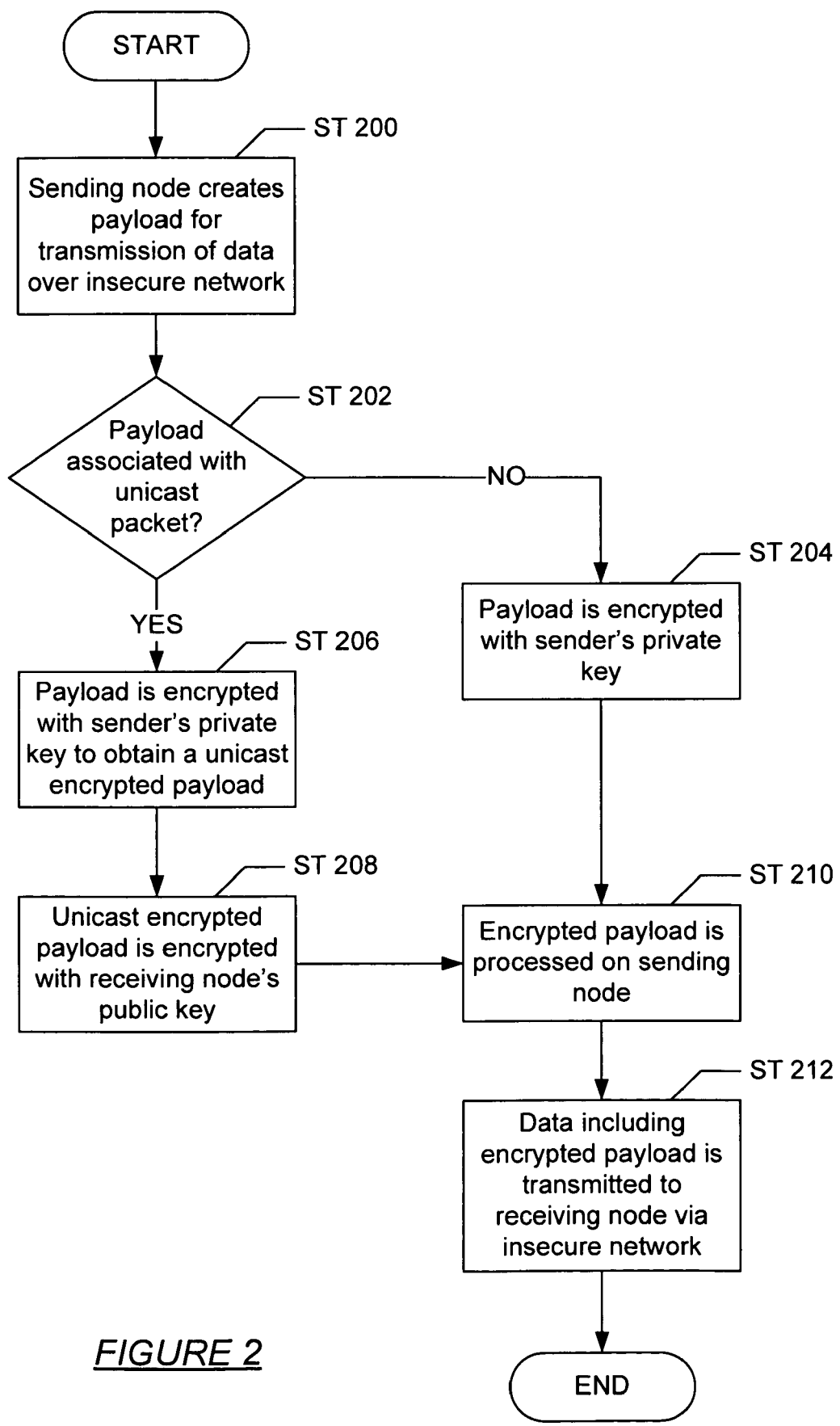
FIG. 2 shows a flow chart for sending data packets in an insecure network in accordance with one embodiment of the invention.

FIG. 2 shows a flow chart for sending data packets in a insecure network in accordance with one embodiment of the invention. Initially, a sending node creates a payload for transmission of data over the insecure network (Step 200). Subsequently, a determination is made whether the payload corresponds to a unicast packet (Step 202). A unicast packet is a packet communicated between a single sender and a single receiver over a network. If the payload is not associated with a unicast packet, then the payload may be associated with a broadcast or multicast packet. A broadcast packet is a packet communication from one sender to all the receivers connected to the network. Multicast packets are communicated from one sender to a specific group of receivers listening on the multicast address port. In one embodiment of the invention, if the payload is not associated with a unicast packet, the payload is encrypted once with the sending node's private key (Step 204).

Alternatively, if the payload corresponds to a unicast packet, then the payload is encrypted with the sending node's private key (Step 206), resulting in a unicast encrypted payload. Subsequently, the result of the encryption in Step 206 (i.e., the unicast encrypted payload) is encrypted again with the receiving node's public key (Step 208). In one embodiment of the invention, the payload is encrypted using asymmetric encryption algorithms, such as RSA, etc. As described above, the sending node uses the public key database (stored locally) to obtain the receiving node's public key that is used in Step 208. Those skilled in the art will appreciate that if the payload is associated with either an broadcast or multicast packet, then the payload is encrypted only once to ensure the identity of the sender (i.e., for signature purposes) because the data packet is received by more than one receiving node.

Continuing with FIG. 2, once the payload is encrypted based on the type of packet, the payload is processed on the sending node (e.g., via the IP layer of the network protocol stack) to obtain data in a form that may be transmitted over the network (Step 210). Finally, the data packet including the encrypted payload is transmitted to the receiving node (or nodes) via the insecure network (Step 212). If the payload is associated with a unicast packet, then the data packet transmitted to the receiving node includes the double-encrypted payload, where as if the payload is not associated with a unicast packet, the data packet transmitted to the receiving node includes a single encrypted payload. As described above, the present invention may be implemented below the IP layer of the network protocol stack. In this case, the payload would be processed in the IP layer before being encrypted in accordance with embodiments of the invention described in FIG. 2. Those skilled in the art will appreciate that the order in which a payload associated with a unicast packet is encrypted does not matter. For example, the payload may be encrypted with the receiving node's public key first, and subsequently encrypted with the sending node's private key.

Those skilled in the art will appreciate that wireless encryption schemes well known in the art may be used in addition to the present invention to further strengthen the security of data exchanged in the insecure network. For example, upon encrypting a payload in accordance with embodiments of the invention described in FIG. 2, WEP or WPA may be used to transmit the data packet including the encrypted payload to further secure the data packet before transmission to a receiving node.

Figure 3:
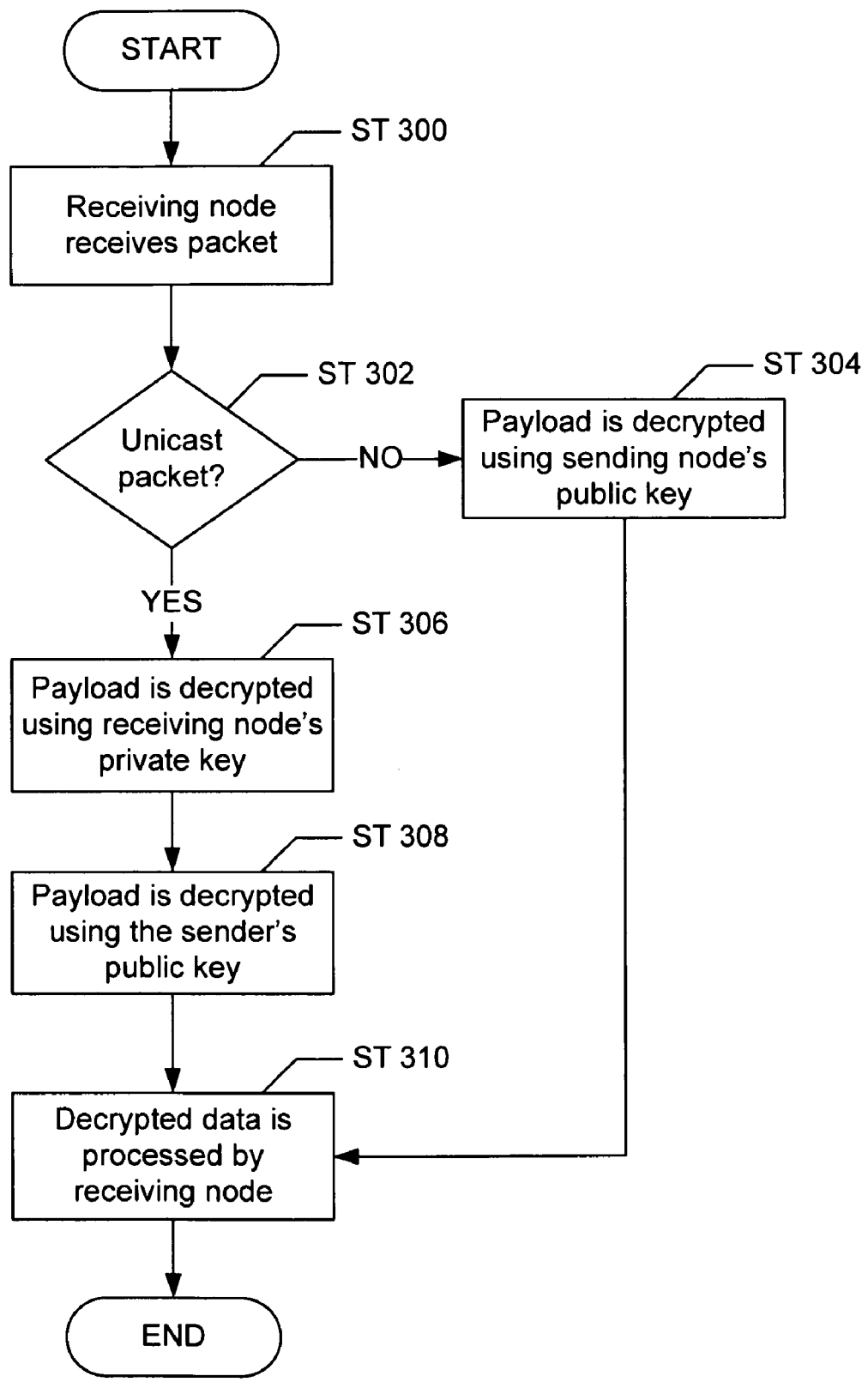
FIG. 3 shows a flow chart for receiving data packets in an insecure network in accordance with one embodiment of the invention.

FIG. 3 shows a flow chart for receiving an encrypted packet in accordance with one embodiment of the invention. Initially, a receiving node receives a packet (Step 300). Subsequently, a determination is made whether the received packet is a unicast packet (Step 302). If the packet is not a unicast packet (i.e., the packet is a broadcast or multicast packet), then the payload is decrypted using the sending node's public key (Step 304). Alternatively, if the received packet is a unicast packet, then the payload is decrypted using the receiving node's private key (Step 306), and the result of the decryption in Step 306 is decrypted again using the sending node's public key (Step 308). Again, the receiving node uses the public key database to decrypt the received packet using the sending node's public key. Further, the payload is decrypted using decryption algorithms corresponding to the asymmetric encryption algorithms used to encrypt the payload by the sending node.

Those skilled in the art will appreciate that the payload is decrypted in the reverse order that the payload is encrypted by the sending node. That is, if the payload is encrypted last with the sending node's private key, then the payload is decrypted on the receiving side with the sender's public key first. Alternatively, if the payload is encrypted last with the receiving node's public key, then the payload is decrypted on the receiving side using the receiving node's private key first. Finally, the decrypted payload is processed (e.g., the decrypted data is read/used) by the receiving node (Step 310). Those skilled in the art will appreciate that the present invention is applicable to the payload of any network packet (e.g., IP packets, etc.).

Figure 4:
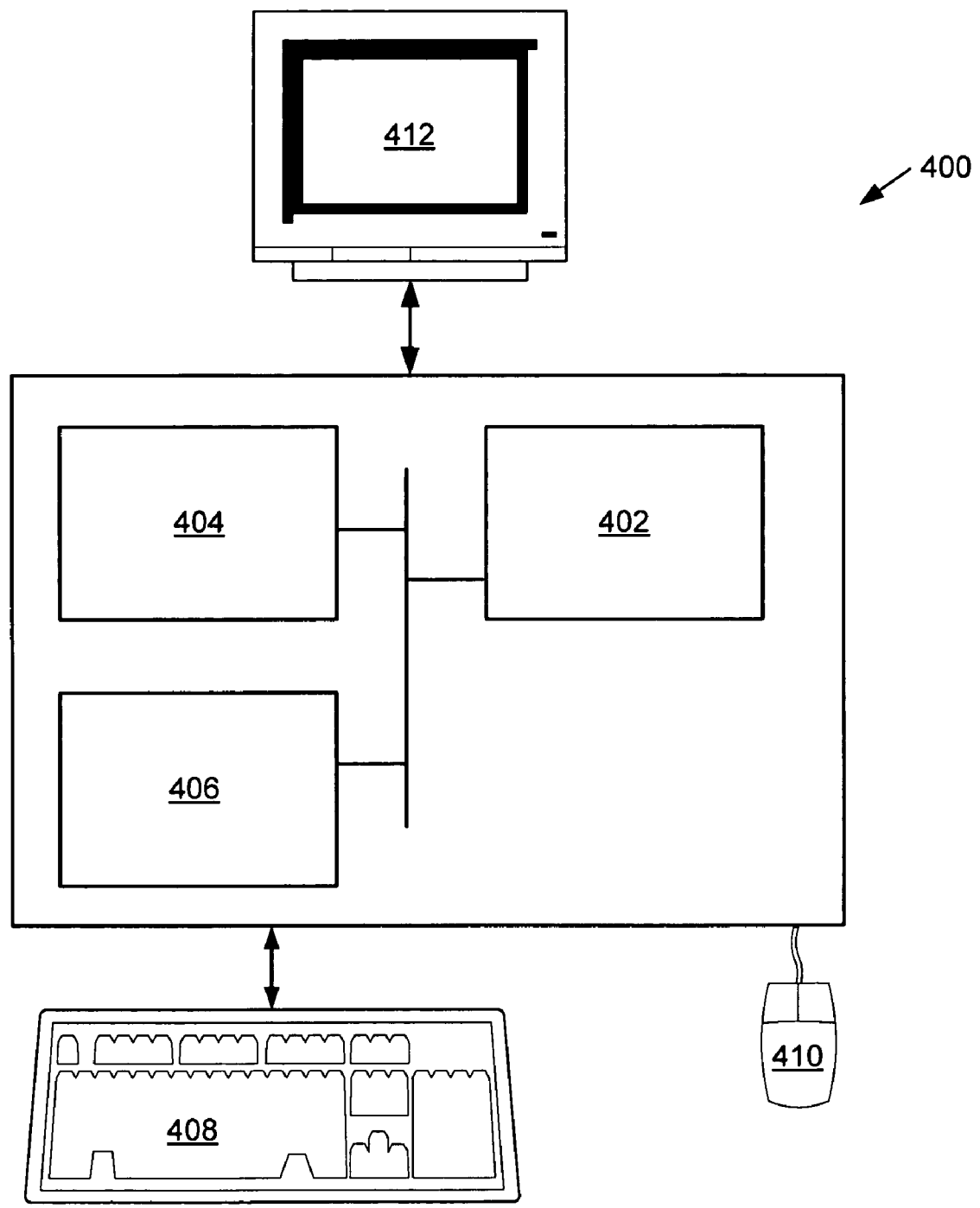
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a method for automatic encryption of a payload of a network packet using asymmetric encryption algorithms. Further, nodes in a insecure network implementing embodiments of the invention do not require the use of special hardware to aid in the security of the data exchanged between nodes of the insecure network. Instead, the nodes of the insecure network exchanging data implement the strong security by encrypting the payload of unicast packets twice before transmitting the packets to a receiving node. Double encryption, as discussed above, guarantees that an unauthorized node is not able to decrypt the data (which requires the private key of the intended recipient), and is not able to send data pretending to be an authorized node (which requires the sender's private key).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing strong security in an insecure network comprising a plurality of nodes, comprising:

creating a payload associated with a data packet for transmission by a sending node;

when the payload is associated with a unicast data packet:

encrypting the payload using a corresponding private key associated with the sending node to obtain a unicast encrypted payload;

encrypting the unicast encrypted payload using a public key associated with a receiving node to obtain a double-encrypted payload; and transmitting the data packet comprising the double-encrypted payload to the receiving node over the insecure network, wherein the sending node and the receiving node are each one of the plurality nodes in the insecure network; and when the payload is not associated with the unicast data packet:

encrypting the payload using a private key associated with the sending node to obtain a non-unicast encrypted payload;

encapsulating the non-unicast encrypted payload via a network protocol stack to obtain the data packet; and transmitting the data packet comprising the non-unicast encrypted payload to the receiving node in the insecure network.

2. The method of claim 1, further comprising:
encapsulating the double-encrypted payload via the network protocol stack to obtain the data packet prior to transmitting the data packet.

3. The method of claim 1, wherein the double-encrypted payload is encrypted using at least one asymmetric cryptographic algorithm.

4. The method of claim 1, wherein the payload is associated with one selected from the group consisting of a multicast data packet and a broadcast data packet, if the payload is not associated with the unicast packet.

5. The method of claim 1, wherein the sending node comprises a database of public keys comprising the public key associated with the receiving node.

6. The method of claim 1, further comprising:
adding a node to the insecure network, wherein adding the node comprises obtaining a public key associated with the node and sending the public key to the plurality of nodes in the insecure network.

7. The method of claim 1, further comprising:
receiving the data packet comprising the double-encrypted payload by the receiving node in the insecure network;
when the data packet is the unicast data packet:
decrypting a payload associated with the data packet using a private key associated with the receiving node to obtain an intermediate payload; and
decrypting the intermediate payload using a public key associated with a sending node to obtain a decrypted payload.

8. The method of claim 7, wherein the receiving node comprises a database of public keys comprising the public key associated with the sending node.

9. The method of claim 7, wherein the payload is decrypted using at least one asymmetric cryptographic algorithm used to encrypt the payload.

10. An insecure network system comprising a plurality of nodes, comprising:
a sending node configured to double encrypt a payload associated with a data packet using a database of public keys operatively connected to the sending node and a private key corresponding to the sending node of which only the sending node is aware, when the data packet is a unicast data packet;

a receiving node configured to decrypt the double encrypted payload using a database of public keys operatively connected to the receiving nod;

wherein the sending node and the receiving node are each one of the plurality nodes in the insecure network system;

the database of public keys operatively connected to the sending node comprising a public key of the receiving node; and the database of public keys operatively connected to the receiving node comprising a public key of the sending node, wherein when the data packet is not a unicast packet:
the sending node is configured to:
encrypt the payload using the private key of the sending node to obtain a non-unicast encrypted payload,
encapsulate the non-unicast encrypted payload via a network protocol stack to obtain the non-unicast data packet; and
transmit the data packet comprising the non-unicast encrypted payload to the receiving node in the insecure network.

11. The system of claim 10, wherein the payload is double encrypted using at least one asymmetric cryptographic algorithm.

12. The system of claim 11, wherein double encrypting the payload comprises encrypting the payload using the private key of the sending node to obtain an encrypted payload, and encrypting the encrypted payload using the public key of the receiving node.

13. The system of claim 10, wherein the payload is associated with one selected from the group consisting of a multicast data packet and a broadcast data packet, if the payload does not correspond to the unicast packet.

14. The system of claim 10, wherein the sending node is further configured to transmit the double-encrypted payload to the receiving node.

15. The system of claim 14, wherein the sending node is further configured to encapsulate the data packet comprising the double-encrypted payload using the network protocol stack prior to transmitting the double-encrypted payload to the receiving node.

16. A computer system for providing strong security in an insecure network comprising a plurality of nodes, comprising:
a processor;
a memory;
a storage device; and
software instructions stored in the memory for enabling the computer system under control of the processor, to:
create a payload associated with a data packet for transmission by a sending node;
when the payload is associated with a unicast data packet:
encrypt the payload using a corresponding private key associated with the sending node to obtain a unicast encrypted payload;
encrypt the unicast encrypted payload using a public key associated with a receiving node to obtain a double-encrypted payload; and
transmit the data packet comprising the double-encrypted payload to the receiving node over the insecure network,
wherein the sending node and the receiving node are one of the plurality nodes in the insecure network; and
when the payload is not associated with the unicast data packet:

encrypt the payload using a private key associated with the sending node to obtain a non-unicast encrypted payload;

encapsulate the non-unicast encrypted payload via a network protocol stack to obtain the data packet; and transmit the data packet comprising the non-unicast encrypted payload to the receiving node in the insecure network.

* * * * *

UNITED STATES PATENT AND TRADEMARK OFFICE
CERTIFICATE OF CORRECTION

PATENT NO. : 7,774,594 B2  
APPLICATION NO. : 11/335217  
DATED : August 10, 2010  
INVENTOR(S) : Alejandro P. Lopez et al.

It is certified that error appears in the above-identified patent and that said Letters Patent is hereby corrected as shown below:

In the claims:
In Claim 10, Column 8 (line 3), "nod;" should read --node,--.

Signed and Sealed this

Fifth Day of October, 2010

David J. Kappos  
*Director of the United States Patent and Trademark Office*